(No Model.) 2 Sheets—Sheet 1.

J. W. MOORE.
AIR VALVE FOR WATER PIPES.

No. 351,994. Patented Nov. 2, 1886.

WITNESSES:
Geo. A. Darby
Geo. E. Cadby

INVENTOR
John W. Moore
BY
Geo. A. Moore
ATTORNEY (No Model.)  2 Sheets—Sheet 2.

J. W. MOORE.
AIR VALVE FOR WATER PIPES.

No. 351,994.  Patented Nov. 2, 1886.

Witnesses.
A. Ruppert.
T. H. Trauernicht

Inventor.
John W. Moore
Per
Thomas P. Simpson
Asso. Atty.

UNITED STATES PATENT OFFICE.

JOHN W. MOORE, OF LANSINGBURG, NEW YORK.

AIR-VALVE FOR WATER-PIPES.

SPECIFICATION forming part of Letters Patent No. 351,994, dated November 2, 1886.

Application filed September 22, 1885. Serial No. 177,805. (No model.)

*To all whom it may concern:*

Be it known that I, JOHN W. MOORE, a resident of Lansingburg, in the county of Rensselaer and State of New York, have invented certain new and useful Improvements in Air-Valves for Water-Pipes; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in air-valves for water-pipes.

The object of my invention is to provide an air-vent for pipes, by which the air can escape when the pipe is filled with water or other liquid, or enter when water is withdrawn from a pipe, the valve being acted upon automatically to close as soon as the confined air has been discharged and before any water can escape through the valve.

My invention consists in providing a pipe with a piston-actuated air-valve, the piston-cylinder, open at its lower end, being inclosed within a shell which connects the valve and pipe.

Figure 1:
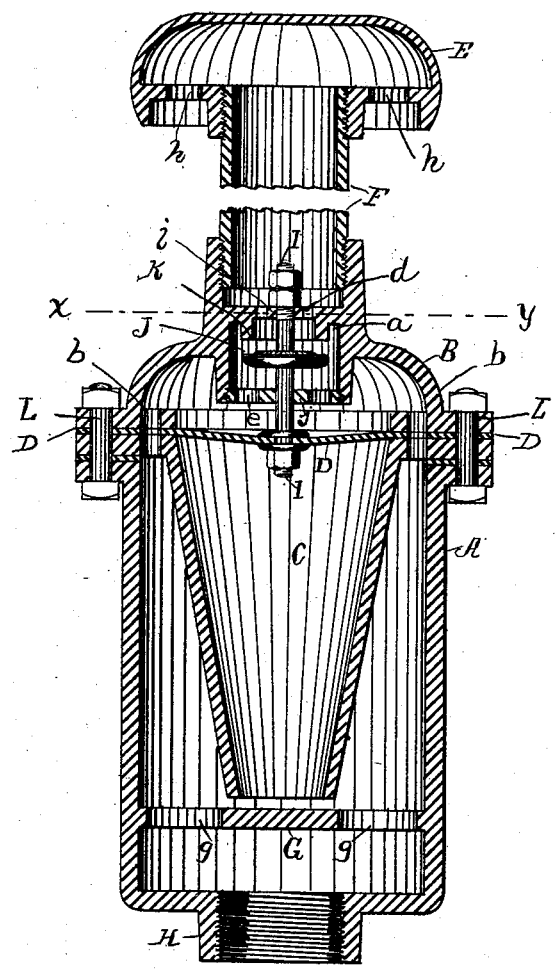
Figure 2:
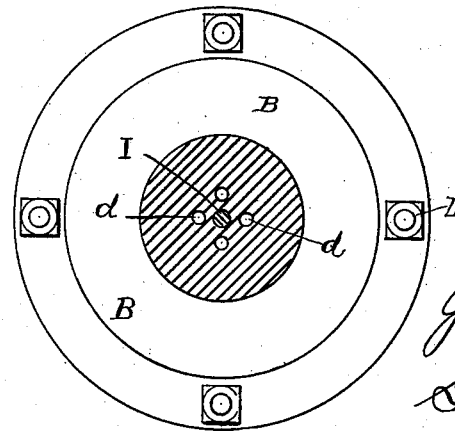
Figure 3:
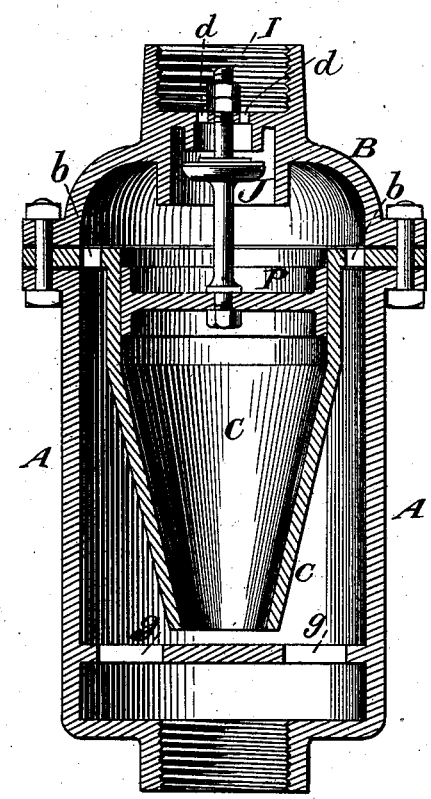

Figure 1 of the drawings is a vertical central section of the valve. Fig. 2 is a horizontal section taken at the broken line *x y* in Fig. 1. Fig. 3 is a vertical central section showing a modified form of the valve.

The inclosing shell is composed of the cylindrical sections A and B, bolted together by bolts L, securely holding between their flanges the diaphragm D, to which is centrally attached the lower end of the stem I. The stem has a bearing in the horizontal partitions *i* and *j* in the shell B, and supports the valve J. The partition *i* is provided with air-passages *d* and the partition *j* with air-passages *e*. There are also air-passages *b* through D, leading from section A to section B; also, air-passages *g* through partition G, and passages *h* through cap E.

Section A is provided with a threaded hollow stem, H, by which the apparatus is secured to the water-pipe at some high, or the highest, point in its length. When water is admitted to the pipe, the inclosed air passes in through H, up through the apertures *g*, *b*, and *e*, around valve J, out at apertures *d* and *h*. When the inclosed air has been discharged from the pipe, the water passes up through H and apertures *g*, and, rising in shell A, flows into the conical cylinder C. As the water rises in this cylinder it compresses the air confined therein until its pressure upon the diaphragm or piston-head is sufficient to bend it upward and close the valve J up against the annulus K, thereby cutting off the passage to the apertures *d* before any water has passed through the apertures *b*. The pressure of water in the pipes serves thereafter to keep the valve closed until the water is drawn off, when the outside atmospheric pressure serves to open the valve, and air passes in to fill the pipe, traveling over the same course it took in passing out. The valve J is so located on its stem as to be open when the diaphragm D is in its normal unconstrained position.

The stem F may be of any desired length, and when the valve is attached to an underground pipe or main at a high point the stem F may extend to the surface of the ground, so that the cap E can be removed without excavating. I am thus able at any time, by removing the cap E and thrusting a rod down the hollow stem F, to open valve J, thereby permitting the escape of any accumulation of air at high points in the pipe. The rod is thrust down F until it strikes the upper end of valve-stem I, which projects up into F, and, forcing the stem downward, opens the valve. In Fig. 1 I have shown the valve-stem attached to a yielding or flexible diaphragm, D, which is acted upon by the compressed air in cylinder C, when the water rises therein, to close the valve. In Fig. 3 I have shown the valve-stem attached to a yielding or movable piston-head, P, which yields to the air-pressure in C and closes the valve in the same manner as the diaphragm. As the water enters the lower open end of air cylinder C and rises therein it compresses the air which was contained in the cylinder, and before the water can rise sufficiently high to pass through the air-ducts *b* the pressure of air within cylinder C against the diaphragm or piston-head has become sufficient to overcome its resistance, whether by reason of its weight or elastic force, and it yields to the pressure, carrying the valve-stem upward sufficiently to close the valve before the water reaches it, thereby preventing the escape of any water.

I am aware that spring-controlled valves to be operated by water-contact have been employed to resist vacuum tendencies in water-pipes, and I do not claim such a form of construction.

What I claim as new, and desire to secure by Letters Patent, is—

1. An inclosing-shell having an upper and lower opening, the upper opening being provided with an air-valve, in combination with an inclosed air-chamber opening at its lower end into said shell, and provided with means, substantially as shown and described, for actuating said air-valve, and an air duct or ducts leading around said air-chamber from one opening in said shell to the other, substantially as described, and for the purposes set forth.

2. In an air-valve for water-pipes, an inclosing-shell, A B, provided with a continuous air-passage through the same, in combination with an air-valve, J, stem I, flexible diaphragm D, and cylinder C, substantially as described, and for the purposes set forth.

In testimony whereof I have hereunto set my hand this 19th day of September, 1885.

JOHN W. MOORE.

Witnesses:
GEO. A. MOSHER,
CHAS. L. ALDEN.